Oct. 27, 1936.  H. B. GIBBONS ET AL  2,058,784
BALANCING APPARATUS
Filed June 2, 1934  2 Sheets-Sheet 1
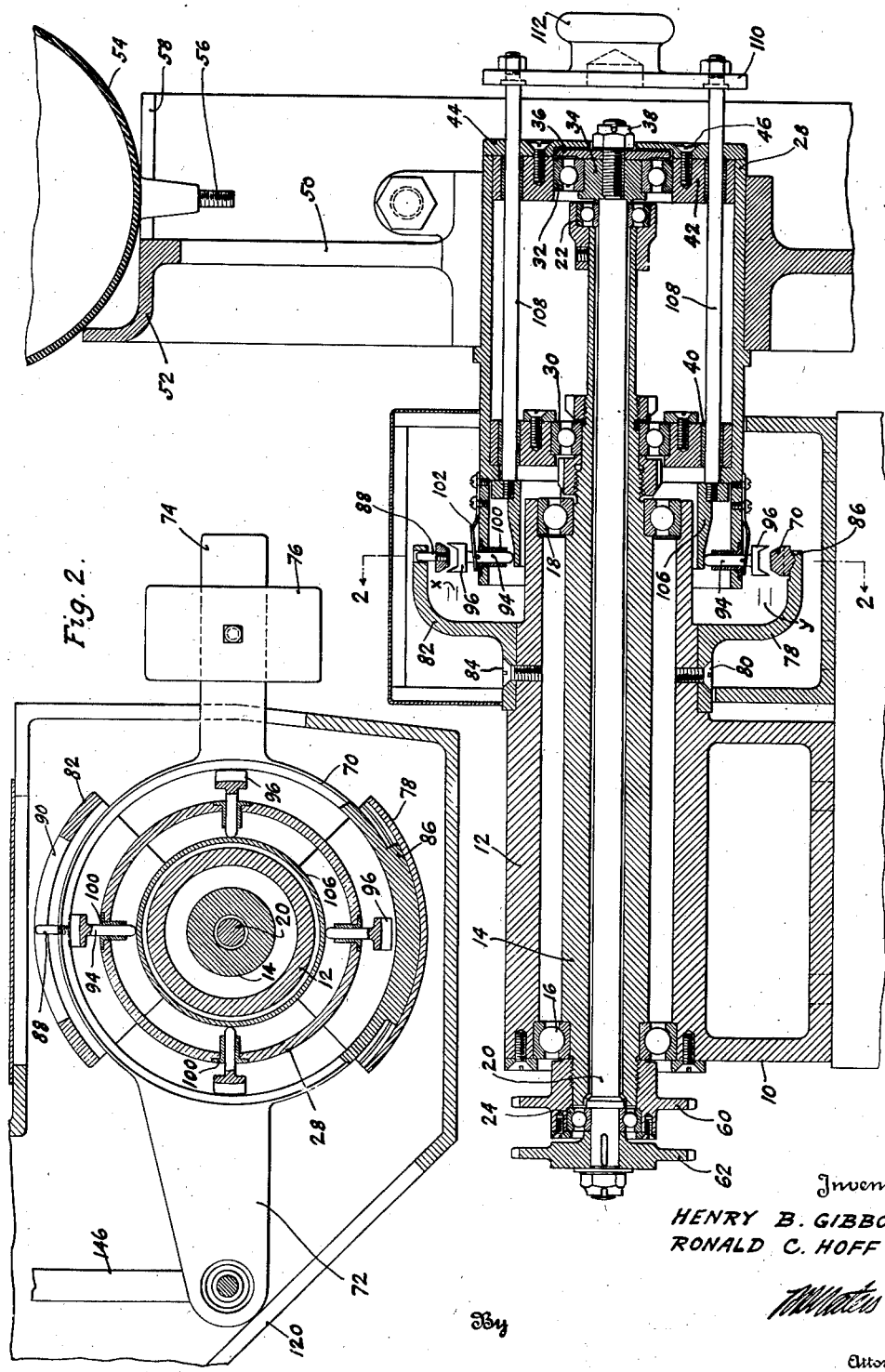
Inventors
HENRY B. GIBBONS
RONALD C. HOFF Oct. 27, 1936.  H. B. GIBBONS ET AL  2,058,784
BALANCING APPARATUS
Filed June 2, 1934  2 Sheets-Sheet 2
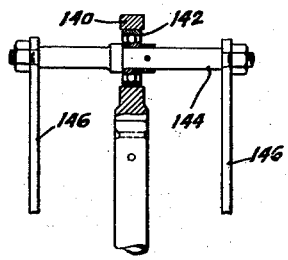
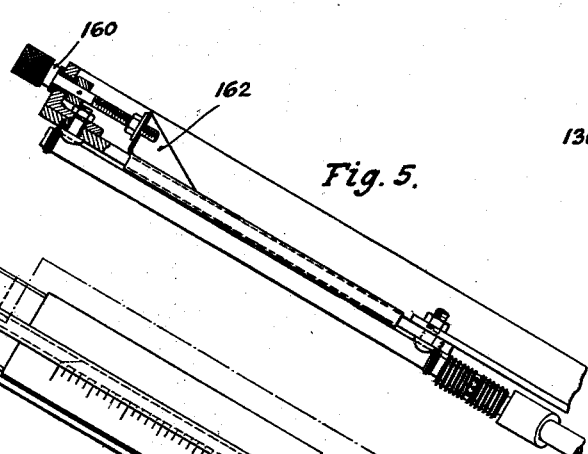
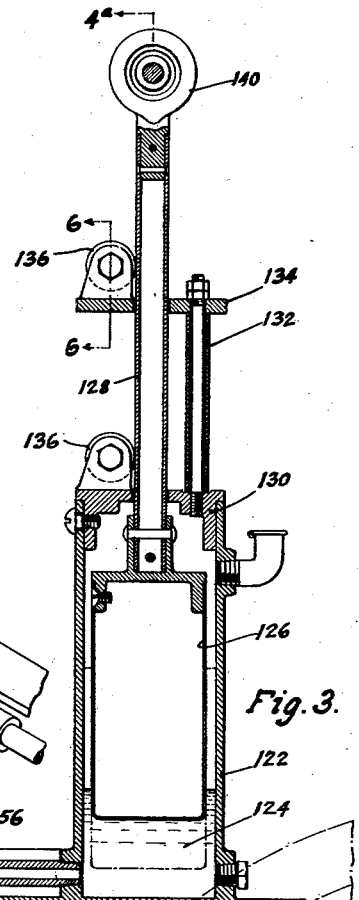
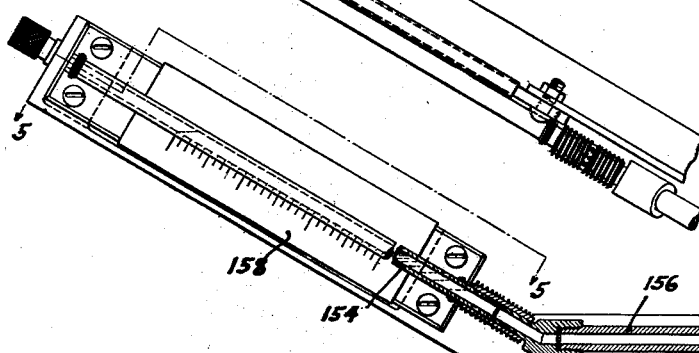
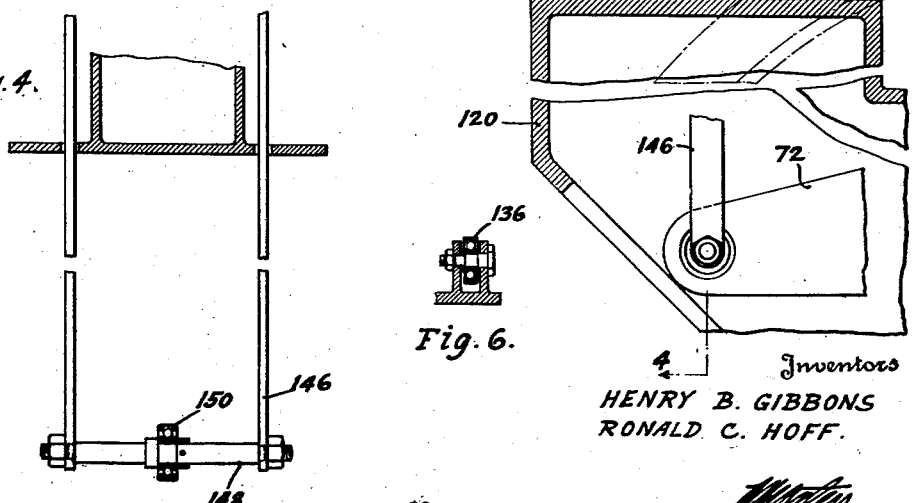
Inventors
HENRY B. GIBBONS
RONALD C. HOFF.

Patented Oct. 27, 1936

2,058,784

UNITED STATES PATENT OFFICE 2,058,784

BALANCING APPARATUS

Henry B. Gibbons and Ronald C. Hoff, Akron, Ohio, assignors to Wingfoot Corporation, Wilmington, Del., a corporation of Delaware Application June 2, 1934, Serial No. 728,714

3 Claims. (Cl. 73—51)

This invention relates to balancing apparatus and more particularly to that type of mechanism adapted for use in determining the balance of annular objects. The invention may also be used for measuring the amount by which any body is out of balance and is readily adapted to be provided with limits whereby the objects tested can be kept up to certain manufacturing standards.

Heretofore different types of balancing equipment have been proposed for balancing annular objects but substantially all prior known types of apparatus have been objectionable in that no provision is made to overcome static friction. Balancing apparatus has been provided with means for measuring the amount by which an object is out of balance, however these means have materially added to the frictional resistance of the apparatus and are moreover ordinarily not directly embodied for simultaneous or alternate use in this type of equipment. It has likewise been found in the past that it is sometimes desirable to determine the heavy portion of the object to be balanced while at other times it is desirable to actually weigh the amount by which the object is out of balance. Former known machines have not been adapted to use in these two capacities and it has been found necessary to use a plurality of different machines to obtain the desired results.

It is an object of the present invention to avoid and overcome the foregoing difficulties of balancing apparatus heretofore employed by the provision, in accordance with the teachings of the present invention, of a comparatively rugged, simple and efficient mechanism for readily determining the balance of an object and more particularly annular objects adapted to be rotatable about an axis.

Another object of the invention is the provision of balancing equipment which can be quickly changed as the operator desires from apparatus adapted to directly weigh the amount of out-of-balance to apparatus which quickly and accurately determines the heavy side of the object to be measured.

Another object of the invention is to provide balancing equipment in which static friction, i. e. the force necessary to overcome the resistance to movement of the bearings supporting the object to be balanced, is substantially eliminated.

Another object of this invention is to provide a substantially frictionless bearing for the support which carries the object to be tested by substantially neutralizing the rolling friction between different portions of the journaling means. Specifically, we employ anti-friction bearings for supporting the rotatable support and drive some of the anti-friction bearings in one direction and others in the opposite direction. This not only eliminates the rolling friction but also eliminates all static friction.

Another object of the invention is the provision of substantially frictionless means for measuring in inch pounds or in like units the weight by which an object is out of balance.

Another object of the invention is to provide a comparatively inexpensive and accurate machine adapted for the commercial testing of annular objects such as inner tubes, tires and the like to determine heavy spots or areas therein and to likewise weigh or measure the amount by which these objects are not in balance.

The foregoing and other objects of the invention are achieved in the embodiment of the invention described hereafter and illustrated in the accompanying drawings wherein:

Fig. 1 is a vertical longitudinal sectional view through the pivotal axis of one form of the balancing apparatus comprising the present invention.

Fig. 2 is a sectional view taken on line 2—2 of Fig. 1.

Fig. 3 is a cross-sectional view taken on the line 2—2 of Fig. 1 and illustrates the measuring mechanism included in the balancing apparatus.

Fig. 4 and Fig. 4a are taken on line 4—4a of Fig. 3, the figures being broken apart because of the distance therebetween.

Fig. 5 is a plan view taken on line 5—5 of Fig. 3.

Fig. 6 is a cross-sectional view taken on line 6—6 of Fig. 3.

It will be appreciated that the balancing apparatus of the present invention is adapted broadly to use with various objects to be balanced but that the same is particularly adapted to measuring and balancing annular objects such as tires or inner tubes. Accordingly the embodiment of the invention selected in accordance with the requirements of the patent statutes for complete illustration and description comprises a form for use in balancing or measuring the out-of-balance of inner tubes.

In the drawings the numeral 10 indicates generally a fixed base or support for the apparatus which may be formed with an integral cylindrical upper portion 12 adapted to receive a hollow shaft 14 journalled by suitable ball bearings 16 and 18 at the ends of the cylindrical member 12. Journalled within the hollow shaft 14 is a shaft 20 carried in ball bearings 22 and 24 mounted at either end of the shaft 14.

A hub 28 is adapted to be mounted in a frictionless manner upon the shafts 14 and 20 and to this end a ball bearing 30 is carried on the shaft 14 and a bearing 32 of similar size and construction is secured to the end of the shaft 20 by means of a collar 34, washer 36 and nut 38. The hub 28 includes disks 40 and 42 mounted within the end of the hub and engaging the bearings 30 and 32. A cover plate 44 over the outer end of the bearing may be secured to the disk 42 as by screws 46.

Secured to the hub 28 is a wheel 50 formed with a suitable flanged periphery 52 adapted to receive the object to be tested, which is indicated at 54 as comprising an inner tube having a stem portion 56 extending within a suitable slot 58 cut in the flanged periphery of the wheel 50. A similar slot may be cut diametrically opposite on the wheel or other measures taken to insure that the wheel 50 will be properly balanced in itself.

The shafts 14 and 20, carrying the bearings 30 and 32 which journal the hub 28, are adapted to be continuously rotated in opposite directions during the balancing operation, and this may be effected by providing sprockets 60 and 62 on the ends of the shafts 14 and 20 remote from the hub 28. These sprockets are driven by any suitable means (not shown) which preferably take the form of an electric motor drive carried integral with the apparatus and mounted on the base 10.

The operation of the apparatus, it is believed, will be apparent from the foregoing description, however a brief resumé of the functioning of the apparatus when used solely to determine the heavy portion of the object balanced now follows. The annular member to be balanced is placed on the flanged periphery 52 of the balancing wheel 50 secured to the hub 28 and the bearings 30 and 32 for the hub are rotated in opposite directions through the sprockets 62 and 60 mounted on the shafts 20 and 14 respectively. By continuously rotating the bearings for the hub in the opposite directions and by making these bearings of the same size and of substantially the same frictional characteristics the static friction necessary for the hub 28 and wheel 50 to turn is largely overcome and the rolling friction in the bearings 16, 18, 30, and 32 substantially neutralize each other. In addition a slight vibrating motion is imparted to the journals and wheel, which assists in obtaining the balancing operation. Therefore, the wheel 50 carrying the object to be balanced will freely turn so that the heavy portion of the object is downwardly. The object can then be marked in any manner on the light side thereof so that in the case of a tire the inner tube valve stem may be placed adjacent the mark on the tire. This will effect a balancing of the tire, tube and wheel assembly in use.

When it is desired to equip the balancing apparatus with additional mechanism for weighing the amount by which an object is out of balance, then additional means must be provided. These means, in the embodiment of the invention illustrated, include a ring 70 formed with an arm 72 at one side and an opposite arm 74 carrying a counter weight 76. The ring 70 ordinarily is carried by an arcuate bracket 78 secured as by screws 80 to the bottom of the cylindrical member 12. A similar arcuate bracket 82 is secured as by screws 84 to the top of the cylindrical member 12. The ring 70 and bracket 78 are preferably formed with a splined arrangement indicated at 86 which will permit relative rotary movement only of the ring. At the top the ring 70 is provided with a radially extending pin 88 which is received in a slot 90 cut in the bracket 82. This arrangement likewise permits only rotary movement of the ring 70 with respect to bracket 82.

Clutch means are employed to releasably secure the hub 28 to the ring 70 and these means may take the form of pins 94 formed with grooved cups 96 at their outer ends which engage with the correspondingly beveled inner periphery of the ring 70. The pins 94 are slidably carried for radial movement in the hub 28 with the aid of suitable sockets 100. Springs 102 are provided on the hub to normally hold the pins 94 in retracted positions free of the ring 70.

A conical cylinder 106 is employed to move the pins 94 outwardly into engagement with the ring 70 and this action may be accomplished by employing rods 108 which are slidably carried in suitable recesses in the disks 40 and 42 so that the ends of the rods 108 not secured to the cone cylinder 106 can be connected to a header plate 110 formed with an operating knob 112. From Fig. 1 of the drawings it will be recognized that when the header plate 110 is in the position shown the cone cylinder allows the pins 94 to be held in positions which do not contact the ring 70, however when the header plate 110 is moved inwardly the cone cylinder 106 will force the pins outwardly into engagement with the ring 70. As indicated at X and Y the distance between the pin cups 96 and the ring 70 is greater adjacent the lower arcuate bracket 78, so that operation of the clutch and cone will actually cause the ring 70 to be picked up off its support on the bracket 78 and to be held in fixed position relative to the hub 28.

The turning movements of the hub as occasioned by the object carried on the balancing wheel 50 will therefore move the ring 70 and thus the integral arm 72 formed thereon. The movements of the arm are measured by the novel equipment now to be described. The base 10 of the apparatus may be formed with an integral bracket or shelf 120 which serves to simultaneously enclose the arm 72 and to function as a support for a cylinder 122. The cylinder 122 contains a liquid 124, such as colored water, which buoyantly supports a float 126 having a piston rod 128 secured to its upper end and extending through a cylinder head 130. Additional supporting means for the piston rod 128 may include a post 132 and a guide plate 134. Ball bearing rollers indicated generally at 136 may be employed on the cylinder head 130 and guide plate 134 to assist in guiding the movement of the piston or float rod 128. Rollers of the type shown at 136 are indicated in cross-section in Fig. 6. The upper end of the float rod 128 is provided with an eye 140 which surrounds a ball bearing 142 which in turn journals a spindle 144. The spindle 144 carries a pair of stout connecting rods 146 which are secured at their other ends to a spindle 148 (Figs. 4 and 4a) journalled by ball-bearing means 150 in the arm 72.

Associated with the float and cylinder is an inclined indicating scale which comprises a glass tube 154 connected by a conduit 156 to the bottom of the cylinder 122. The inclined glass tube 154 has associated therewith a graduated scale 158 whereby the changes in level of the liquid 124 in the tube 154 and cylinder 122 can be readily determined. A calibration or zero-setting for the scale 158 can be had if desired and this may take the form of screw-adjustment means 160 which can be rotated in a threaded bracket 162 secured to the scale 158. It will be appreciated that the weight of the float 126, rod 128, connecting rods 146, etc. is exactly counter-balanced by the counterweight 76 so that movement of the float will only be occasioned by turning movement of the wheel 50.

The operation of the weighing mechanism on the balancing apparatus has been partially explained above, however it briefly comprises: first, locating the heavy side of the object and marking the same as heretofore explained, then rotating the balancing wheel and object carried thereby so that the heavy side of the object is located in a horizontal plane intersecting the axis of the wheel or in a position half way between its gravitational dead centers. For example, in weighing the amount of out-of-balance of the inner tube 54, in which the valve stem 56 may be considered as causing the over-balance of the tube, the balancing wheel 50 is rotated so that the slot 58 formed therein is 90° from the bottom of the wheel and when in this position the clutch, including the cone cylinder 106, is engaged by pushing the header plate 110 to its innermost position thereby forcing the cup pins 94 to pick up the ring 70. Thus, when the inner tube to be weighed is placed on the wheel 50 with the valve stem 56 projecting horizontally through the slot 58, the wheel will rotate downwardly under the action of gravity so that through the clutch mechanism the ring 70 will be turned, moving arm 72 which, through connecting rods 146 and float rods 128, will move the float 126 downwardly into the supporting liquid 124. Movement of the float downwardly into the liquid will force the liquid 124 upwardly in the inclined glass tube 154 thereby indicating the weight in inch pounds or other suitable units, of the amount that the inner tube weighed is out of balance. The float 126 will be forced downwardly into the liquid 124 until an equilibrium has been reached between the liquid forced into the tube 154 and the amount that the object is out of balance. It will be understood that the opposite rotation of the shafts 14 and 20 is continued during this weighing operation so as to reduce friction and render the mechanism more sensitive.

Limits can be provided on the indicating scale 158 whereby the commercially unsatisfactory articles can be readily determined and rejected. As soon as the article is removed from the wheel 50 the weight of the liquid in the inclined tube 154 will raise the float 126 to return the wheel 50 to its original position so that the slot 58 will again be coincident with a horizontal diameter of the wheel. The operation can then be repeated with the next article to be tested.

Change from the weighing use of the equipment back to a mere determination of the heavy portion of the article is readily accomplished by merely releasing the clutch by pulling out the cone cylinder 106 through the operation of header plate 110 and knob 112, which will allow the ring 70 to settle or rest on the arcuate bracket 78.

From the foregoing it will be evident that an improved type of balancing apparatus has been provided by the present invention in which objects may be readily tested for either the heavy side or the amount of out of balance or both. The improved balancing mechanism incorporates means for overcoming static and rolling friction and the apparatus is comparatively simple and rugged and can be employed after little training by the ordinary laborer rapidly and efficiently to check the balance of any object for which it is adapted.

While in accordance with the patent statutes one embodiment of the invention has been illustrated and described in detail, it will be appreciated that the invention is not limited thereto or thereby but is defined in the appended claims.

What we claim is:

1. In a device for measuring the amount by which a rotatable object is out of balance, a rotatable member for carrying said object, an arcuate member positioned adjacent the rotatable member, means normally supporting the arcuate member independently of the rotatable member, means carried by the rotatable member for removing the arcuate member from its normal support and for securing the arcuate member to the rotatable member, and means for indicating movement of the arcuate member when in the last-mentioned position.

2. In a device for measuring the amount by which a rotatable object is out of balance, the combination with a rotatable member for carrying said object, means for journaling said rotatable member comprising a plurality of rotatable members moving in opposite directions with respect to each other to eliminate static friction and substantially neutralize the rolling friction between said journaling means and said rotatable member, indicating means cooperating with said rotatable member for indicating the amount which an object placed upon said member is out of balance, a floating ring normally free of said rotatable member but adapted to be clutched to said rotatable member and be connected directly thereto and concentrically therewith to move in unison with said rotatable member, and clutching means for connecting said floating ring to said rotatable member in the aforesaid manner, the floating ring having a connection with said indicating means for operating the same.

3. In a device for measuring the amount by which a rotatable object is out of balance, the combination with a rotatable member for carrying said object, means for journaling said rotatable member comprising a plurality of rotatable members moving in opposite directions with respect to each other to eliminate static friction and substantially neutralize the rolling friction between said journaling means and said rotatable member, indicating means cooperating with said rotatable member for indicating the amount which an object placed upon said member is out of balance, a floating ring normally free of said rotatable member but adapted to be clutched to said rotatable member and be connected directly thereto and concentrically therewith to move in unison with said rotatable member, and clutching means for connecting said floating ring to said rotatable member in the aforesaid manner, having a connection with said indicating means for operating the same, said clutching mechanism comprising radially movable clutching elements normally out of engagement with said ring and a slidable element adapted to force said clutching elements outwardly into engagement with said ring, said clutching elements also centering said ring with respect to the axis of rotation of said rotatable member, whereby said floating ring is supported directly by and moves in unison with said rotatable member.

RONALD C. HOFF.
HENRY B. GIBBONS.